United States Patent
Harada et al.

(10) Patent No.: US 10,631,294 B2
(45) Date of Patent: Apr. 21, 2020

(54) USER TERMINAL, RADIO BASE STATION, RADIO COMMUNICATION SYSTEM AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/107,162

(22) PCT Filed: Nov. 13, 2014

(86) PCT No.: PCT/JP2014/080073
§ 371 (c)(1),
(2) Date: Jun. 22, 2016

(87) PCT Pub. No.: WO2015/098340
PCT Pub. Date: Jul. 2, 2015

(65) Prior Publication Data
US 2017/0034825 A1 Feb. 2, 2017

(30) Foreign Application Priority Data
Dec. 26, 2013 (JP) .................................. 2013-269756

(51) Int. Cl.
*H04W 72/04* (2009.01)
*H04W 8/00* (2009.01)
(Continued)

(52) U.S. Cl.
CPC ....... *H04W 72/0453* (2013.01); *H04W 8/005* (2013.01); *H04W 52/0235* (2013.01);
(Continued)

(58) Field of Classification Search
CPC . H04W 72/0453; H04W 76/14; H04W 8/005; H04W 52/0235; H04W 48/12;
(Continued)

(56) References Cited

U.S. PATENT DOCUMENTS

2012/0184311 A1* 7/2012 Yamamoto .......... H04W 56/002
455/502
2012/0269178 A1* 10/2012 Li ..................... H04W 56/0045
370/336
(Continued)

FOREIGN PATENT DOCUMENTS

JP 2013229746 A 11/2013
WO 2012166969 A1 12/2012
(Continued)

OTHER PUBLICATIONS

Office Action issued in the counterpart Japanese Patent Application No. 2017-014655, dated Nov. 28, 2017 (4 pages).
(Continued)

*Primary Examiner* — Hardikkumar D Patel
(74) *Attorney, Agent, or Firm* — Osha Liang LLP

(57) ABSTRACT

A user terminal that is capable of transmitting and receiving device-to-device signals, and has a receiving section that receives system information, which is transmitted from the connecting or serving radio base station and contains at least information about the resources for transmitting and receiving the device-to-device signals, and a control section that, based on the information about the device-to-device signal transmitting/receiving resources, executes control so that the device-to-device signals are transmitted and received in a second frequency carrier, which is different from a first frequency carrier, in which the information about the device-to-device signal transmitting/receiving resources is transmitted. Thus, the increase of power consumption in D2D terminals is prevented even when a frequency carrier that
(Continued)

does not have an expanded coverage is used as a D2D signal transmitting/receiving resource where D2D operations are executed in a network in which multiple frequencies are in use.

1 Claim, 12 Drawing Sheets

(51) Int. Cl.
*H04W 52/02* (2009.01)
*H04W 76/14* (2018.01)
*H04W 48/12* (2009.01)

(52) U.S. Cl.
CPC ............ *H04W 76/14* (2018.02); *H04W 48/12* (2013.01); *Y02D 70/1262* (2018.01); *Y02D 70/1264* (2018.01); *Y02D 70/21* (2018.01); *Y02D 70/23* (2018.01)

(58) Field of Classification Search
CPC ......... H04W 36/0011; H04W 36/0083; H04W 36/0088; H04W 36/32; H04W 4/00; H04W 4/90; H04W 76/023; H04W 72/0446; H04W 4/22; H04W 88/02; H04W 72/048; H04W 72/00; H04W 28/08; H04W 72/042; H04W 52/0212; H04W 72/005; H04W 92/02; H04W 36/22; H04W 72/046; H04W 52/0245; H04W 72/0413; H04W 52/0209; H04W 68/00; H04W 52/0206; H04W 52/383; H04W 4/70; H04W 24/10; H04W 36/30; H04W 36/0055; H04W 36/20; H04W 36/08; H04L 1/1822; H04L 1/1874; H04L 1/1812; H04L 5/0055; H04L 1/1861; H04B 17/00; H04B 7/15542; H04B 7/2656; H04J 11/0076; Y02D 70/1264; Y02D 70/21; Y02D 70/00; Y02D 70/1262; Y02D 70/23
See application file for complete search history.

(56) References Cited

U.S. PATENT DOCUMENTS

| | | |
|---|---|---|
| 2013/0308552 A1 | 11/2013 | Madan et al. |
| 2014/0153390 A1 | 6/2014 | Ishii et al. |
| 2014/0187283 A1* | 7/2014 | Nimbalker .......... H04W 72/048 455/550.1 |
| 2014/0206372 A1 | 7/2014 | Zeng et al. |
| 2015/0031353 A1* | 1/2015 | Hakola ................ H04W 48/16 455/422.1 |
| 2015/0087283 A1 | 3/2015 | Isobe et al. |
| 2015/0156757 A1 | 6/2015 | Kalhan |
| 2015/0312923 A1 | 10/2015 | Guo |
| 2015/0341934 A1* | 11/2015 | Sorrentino .......... H04B 7/2656 370/329 |
| 2015/0350459 A1 | 12/2015 | Isobe et al. |
| 2016/0037466 A1* | 2/2016 | Yang .................... H04W 48/14 370/350 |

FOREIGN PATENT DOCUMENTS

| | | |
|---|---|---|
| WO | 2013044718 A1 | 4/2013 |
| WO | 2013157438 A1 | 10/2013 |
| WO | 2013177449 A1 | 11/2013 |
| WO | 2013182115 A1 | 12/2013 |

OTHER PUBLICATIONS

Extended European Search Report issued in the counterpart European Patent Application No. 14874819.7, dated Aug. 1, 2017 (8 pages).
Office Action dated Mar. 14, 2017, in corresponding Japanese Patent Application No. 2013-269756 (8 pages).
Intel Corporation, "On D2D Discovery Transmission Timing," 3GPP TSG RAN WG1 Meeting #75, R1-135955, San Francisco, USA, Nov. 11-15, 2013 (7 pages).
Alcatel-Lucent Shanghai Bell, Alcatel-Lucent, "D2D timing," 3GPP TSG RAN WG1 Meeting #74, R1-132994, Barcelona, Spain, Aug. 19-23, 2013 (6 pages).
Office Action issued in the counterpart Japanese Patent Application No. 2013-269756, dated Jul. 11, 2017 (9 pages).
International Search Report issued in corresponding application No. PCT/JP2014/080073 dated Jan. 20, 2015 (4 pages).
Written Opinion of the International Searching Authority issued in corresponding application No. PCT/JP2014/080073 dated Jan. 20, 2015 (3 pages).
Balazs Bertenyi, "Key Drivers for LTE success: Services Evolution"; 3GPP Seminar, LTE Asia; Sep. 6, 2011 (15 pages).
Office Action issued in counterpart European Patent Application No. 14874819.7, dated Jul. 10, 2018 (7 Pages).
Office Action issued in the counterpart European Patent Application No. 14874819.7, dated Feb. 20, 2019 (5 pages).
Office Action issued in the counterpart European Patent Application No. 14874819.7, dated Oct. 7, 2019 (7 pages).

\* cited by examiner

USER TERMINAL, RADIO BASE STATION, RADIO COMMUNICATION SYSTEM AND RADIO COMMUNICATION METHOD

TECHNICAL FIELD

The present invention relates to a user terminal, a radio base station, a radio communication system and a radio communication method in a next-generation mobile communication system.

BACKGROUND ART

In LTE (Long Term Evolution) and successor systems of LTE (referred to as, for example, "LTE-advanced," "FRA (Future Radio Access)," "4G," etc.), D2D (Device-to-Device) technology is under study, whereby user terminals communicate with each other directly, without involving radio base stations (see, for example, non-patent literature 1).

In studying inter-terminal communication and discovery techniques (D2D communication/discovery), whether or not a terminal (D2D terminal) that performs D2D operations (transmission and reception of device-to-device signals, including D2D communication and D2D discovery) are present in the network coverage is one important precondition.

CITATION LIST

Non-Patent Literature

Non-patent Literature 1:
"Key Drivers for LTE Success: Services Evolution," 2011 September, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF THE INVENTION

Technical Problem

When D2D signals are transmitted and received in a network where multiple frequencies are in use, if a frequency carrier that does not have an expanded coverage is used as a D2D signal transmitting/receiving resource, this may result in the situation where many D2D stay outside the coverage, and there is a problem that D2D signals cannot be transmitted or received efficiently based on control from the network and the power consumption in D2D terminals increases.

The present invention has been made in view of the above, and it is therefore an object of the present invention to provide a user terminal, a radio base station, a radio communication system and a radio communication method which can prevent the increase of power consumption in D2D terminals even when a frequency carrier that does not have an expanded coverage is used as a D2D signal transmitting/receiving resource where D2D signals are transmitted and received in a network in which multiple frequencies are in use.

Solution to Problem

The user terminal according to the present invention provides a user terminal that is capable of transmitting and receiving device-to-device signals, and that has a receiving section that receives system information, which is transmitted from the connecting or serving radio base station and which contains at least information about the resources for transmitting and receiving the device-to-device signals, and a control section that, based on the information about the device-to-device signal transmitting/receiving resources, executes control so that the device-to-device signals are transmitted and received in a second frequency carrier, which is different from a first frequency carrier, in which the information about the device-to-device signal transmitting/receiving resources is transmitted.

Technical Advantage of the Invention

According to the present invention, even when a frequency carrier that does not have an expanded coverages is used as a D2D signal transmitting/receiving resource where D2D signals are transmitted and received in a network in which multiple frequencies are in use, it is still possible to transmit and receive D2D signals efficiently based on control from the network, and prevent the increase of power consumption in D2D terminals.

DESCRIPTION OF EMBODIMENTS

Now, an embodiment of the present invention will be described below in detail with reference to the accompanying drawings.

During the transmission and reception of D2D signals, periodic uplink resource groups are allocated to D2D terminals, semi-statically, as D2D signal transmitting/receiving resources. Each D2D terminal transmits signals using part of the D2D signal transmitting/receiving resources. Also, each D2D terminal finds out other D2D terminals, communicates and so on by receiving signals transmitted from other D2D terminals among the D2D signal transmitting/receiving resources.

Figure 1A:
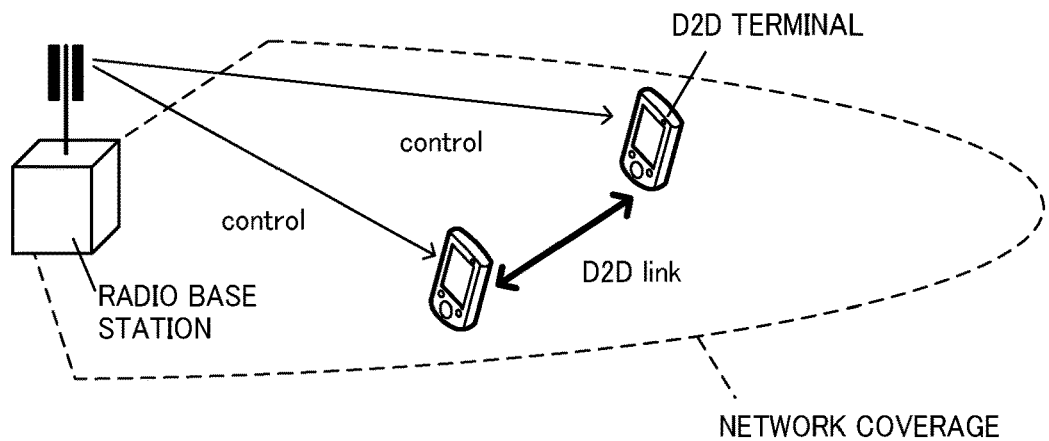
FIG. 1A is a diagram to explain an example where D2D terminals are present in a network coverage.

FIG. 1A is a diagram to show an example in which D2D terminals are present in the coverage of a network. As shown in FIG. 1A, when D2D terminals are present in a network coverage, the radio base station controls the resources for use for the D2D terminals in the coverage and so on. The D2D terminals perform signal transmitting/receiving operations and so on based on control from the network.

Figure 1B:
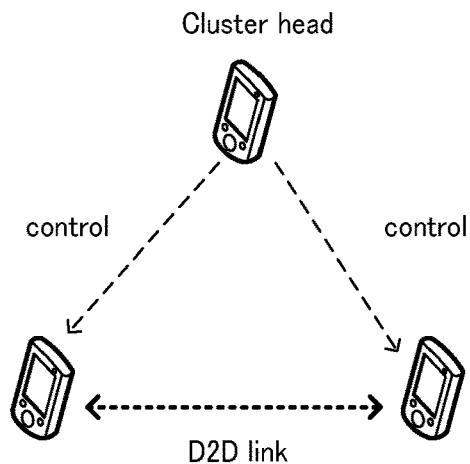
FIG. 1B and FIG. 1C are diagrams to explain an example where D2D terminals are present outside a network coverage.
Figure 1C:
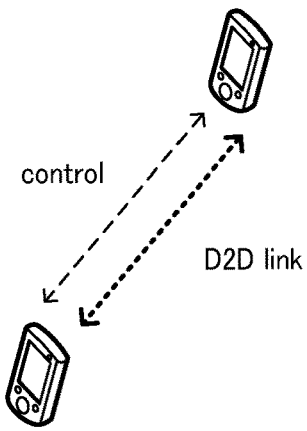

FIG. 1B and FIG. 1C are diagrams to explain examples in which D2D terminals are present outside the network coverage. As shown in FIG. 1B, when D2D terminals are present outside the coverage of a network, a given D2D terminal serves as the cluster head and controls the other D2D terminals. The other D2D terminals perform signal transmitting/receiving operations and so on based on control from the cluster head. Alternatively, as shown in FIG. 1C, D2D terminals are controlled individually in performing signal transmitting/receiving operations and so on.

When D2D terminals are present in the network coverage and when D2D terminals are present outside the network coverage, varying use cases and operations of D2D communication apply.

When D2D terminals are present in the network coverage, D2D signals are transmitted and received, for example, for commercial use cases—that is, for allowing SNS (Social Networking Service) and advertisement distribution and so on by means of direct inter-terminal communication functions (proximity-based service). In this case, as described earlier, the network controls the resources for use for the D2D terminals and so on.

When D2D terminals present outside the network coverage, D2D signals are transmitted and received, for example, for securing public safety—that is, for making urgent communication in times of disaster and so on. In this case, as described earlier, it is necessary to allow D2D terminals to operate autonomously, or apply control between terminals.

In order to achieve increased network capacity, LTE and LTE-advanced networks may be structured to accommodate multiple frequencies, not only a single frequency. For example, a structure may be employed in which macro cells use a carrier of a relatively low frequency band such as 2 [GHz], and small cells use a carrier of a relatively high frequency band such as 3.5 [GHz].

Figure 2:
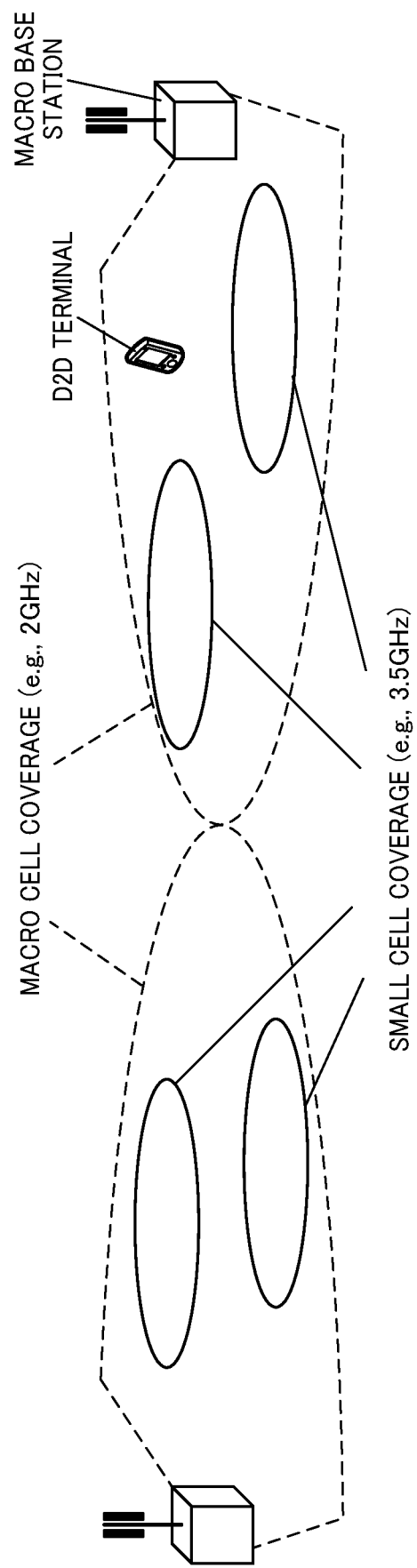
FIG. 2 is a diagram to explain how the coverage varies per frequency carrier.

In this case, as shown in FIG. 2, the coverage varies per frequency carrier. The macro cells achieve wide coverages by using a low frequency band carrier. Generally, macro cells operate in frequencies to which existing terminals of Rel. 8 to Rel. 11 and terminals of Rel. 12 can connect. Small cells are placed in a localized manner so as to cover heavy-traffic areas.

A macro base station to form a macro cell and a small base station (not shown in FIG. 2) to form a small cell are connected via a backhaul link. To be more specific, the operation in which a macro base station and a small base stations are coordinated via backhaul and the macro base station assists the small base station—that is, the operation in which a macro base station makes a small base station be dependent thereon—may be assumed here. Also, between a plurality of small base stations, too, connection may be established via a backhaul link.

In order to achieve advantages such as wide coverage and backward compatibility, uplink resources in the macro cell frequency may be used for existing terminals of Rel. 8 to Rel. 11 and terminals of Rel. 12, for VoIP (Voice over Internet Protocol) and so on. Consequently, uplink resources in the macro cell frequency leave little room, and are therefore inadequate to use as D2D signal transmitting/receiving resources.

Meanwhile, given that, for example, existing terminals of Rel. 8 to Rel. 11 do not connect with a small cell that uses a new high frequency band, it may be possible that uplink resources are relatively abundant. Consequently, it is preferable to use the small cell's frequency as a D2D signal transmitting/receiving resource.

However, small cells, unlike macro cells, do not have expanded coverage. Consequently, as show in FIG. 2, the situation might occur where many D2D terminals that are present within a macro cell's coverage are present outside small cell coverages. In this case, if the small cell frequency is used as a D2D signal transmitting/receiving resource, many D2D terminals operate as when they are present outside the coverages. To be more specific, a D2D terminal identifies itself as the cluster head and controls the resources of other D2D terminals. The D2D terminal, having become the cluster head, increases its power consumption and operates inefficiently.

By contrast with this, the present inventors have found out controlling the transmission and reception of D2D signals by means of a cellular frequency carrier, which is different from the frequency carriers which D2D terminals use as D2D signal transmitting/receiving resources. By this means, the cluster head operations of D2D terminals in the network coverage become unnecessary, so that it is possible to reduce the power consumption of D2D terminals.

Figure 3:
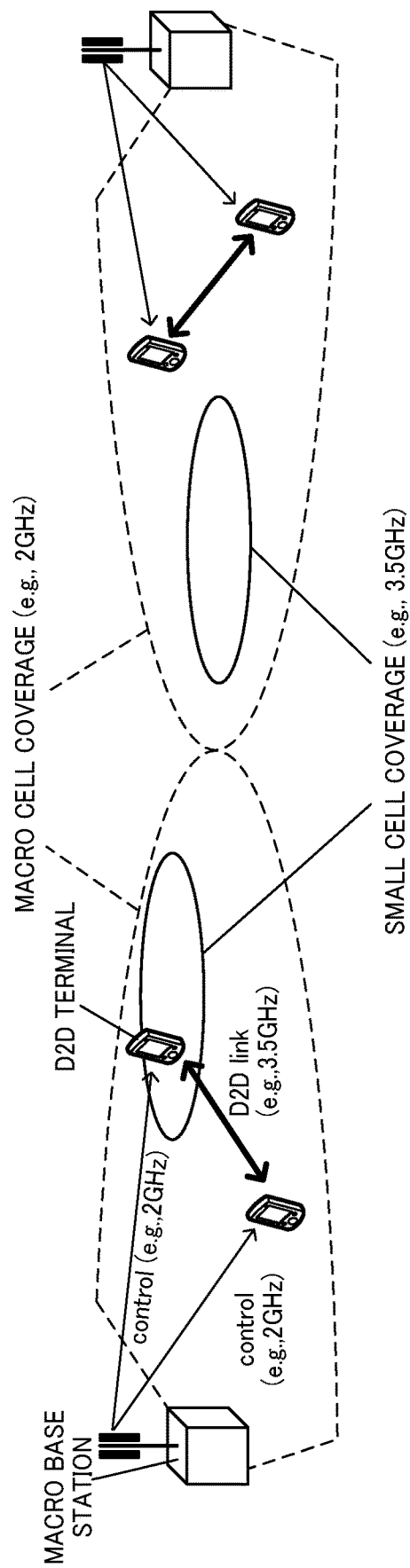
FIG. 3 is a diagram to explain how the transmission and reception of D2D signals are controlled with a cellular frequency carrier that is different from the frequency carrier which D2D terminals use as a D2D resource.

For example, as shown in FIG. 3, even when D2D terminals transmit and receive D2D signals by using a small cell frequency (for example, 3.5 [GHz]) as a D2D signal transmitting/receiving resource, for those D2D terminals that are present in the coverage of a macro cell frequency (for example, 2 [GHz]), the macro cell controls the resources for use for the D2D terminals and so on. This makes it possible to control all the D2D terminals that are present in the macro cell coverage from the network, so that the cluster head operations of D2D terminal in the macro cell coverage become unnecessary.

Even when a D2D terminal uses a dedicated frequency as a D2D signal transmitting/receiving resource, in order to allow efficient control using the existing LTE network, a mechanism to allow operation even when the frequency carrier that is used to transmit and receive D2D signals and the frequency carrier that is subject to control from the network vary is required. Consequently, the present invention can be applied, but not limited, to cases where D2D terminals transmit and receive D2D signals by using small cell frequencies as D2D signal transmitting/receiving resources.

Now, a method to control the transmission and reception of D2D signals with a cellular frequency carrier, which is different from the frequency carriers which D2D terminals use as D2D signal transmitting/receiving resources, will be described below in detail.

First Example

With a first example, the allocation of D2D signal transmitting/receiving resources, D2D synchronization and the scheduling of D2D signal transmitting/receiving resources in a D2D signal transmission/reception control method whereby the transmission and reception of D2D signals is controlled with a cellular frequency carrier, which is different from the frequency carriers which D2D terminals use as D2D signal transmitting/receiving resources, will be described.

First, the allocation of D2D signal transmitting/receiving resources will be described. For D2D signal transmitting/receiving resources, part of the regular cellular communication uplink resources is used. In order to prevent interference, cellular communication signals and D2D signals are time-division-multiplexed (TDM: Time Division Multiplexing).

The cellular base station, such as that of a macro cell, reports information about the allocation of D2D signal transmitting/receiving resources, to D2D terminals in the area, by using system information that is included and transmitted in system information block type x (SIBx: System Information Block) and so on. The D2D signal transmitting/receiving resource allocation information contains the carrier frequency of the D2D signal transmitting/receiving resources (carrier Freq-D2D) and time-domain resource information.

The cellular base station may report the D2D signal transmitting/receiving resource allocation information to the D2D terminals in the area by using higher layer signaling such as RRC (Radio Resource Control) signaling.

Figure 4:
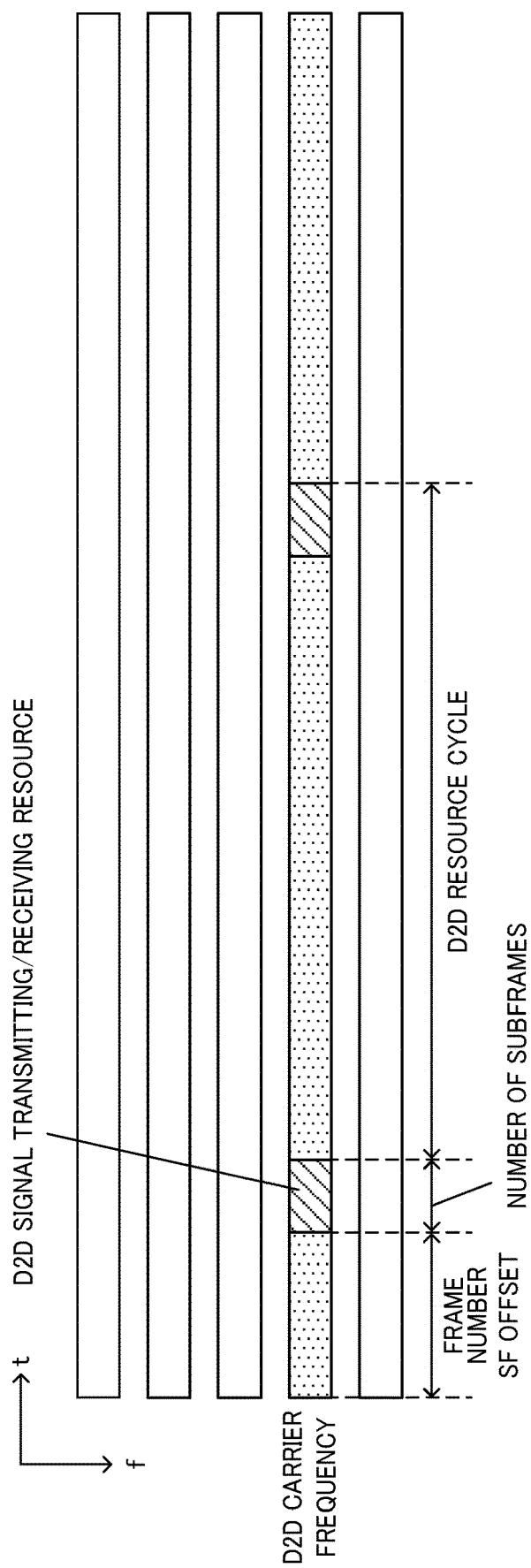
FIG. 4 is a diagram to explain the allocation of D2D signal transmitting/receiving resources when the network accommodates a plurality of frequency carriers, according to a first example.

As shown in FIG. 4, when the network accommodates a plurality of frequency carriers, a specific frequency carrier is reported as the carrier frequency for the D2D signal transmitting/receiving resources. The time domain resource information contains the top frame number, the subframe offset value, the number of subframes, the D2D resource cycle and so on.

The cellular base station reports the D2D signal transmitting/receiving resource allocation information to all the D2D terminals in the area by using system information, so that all the terminals in the area, including idle terminals, identify the same time and frequency resources as D2D signal transmitting/receiving resources. The terminals transmit and receive D2D signals in accordance with the D2D signal transmitting/receiving resource allocation information that is contained in the connecting or serving cell's system information.

Following this, D2D synchronization, which takes place after the system information has been received from the cellular base station, will be described. The D2D terminals, having received the system information, establish synchronization in order to transmit and receive D2D signals.

When a macro cell and a small cell operate synchronously, D2D terminals synchronize the D2D signal transmitting/receiving resources by using the PSS/SSS (Primary Synchronization Signal/Secondary Synchronization Signal), provided as the macro cell's synchronization signals, as the source of synchronization. In this case, all the D2D terminals in the macro cell coverage can use the same synchronization timing.

If the macro cell and the small cell operate asynchronously, the D2D terminals detect synchronization signals in the small cell frequency, and synchronize the D2D signal transmitting/receiving resources.

If the macro cell and the small cell operate asynchronously and there is a D2D terminal in the small cell coverage, the D2D terminal synchronizes the D2D signal transmitting/receiving resources by using the PSS/SSS transmitted from the small cell as the source of synchronization. Furthermore, the D2D terminal transmits the D2D synchronization signal (PD2DSS: Physical D2D Synchronization Signal).

If the macro cell and the small cell operate asynchronously and there is a D2D terminal in a location that is outside the small cell coverage but close to the small cell coverage nevertheless, the D2D terminal synchronizes the D2D signal transmitting/receiving resources by using the D2D synchronization signals (PD2DSSs) transmitted from D2D terminals that are present in the small cell coverage as the source of synchronization.

If the macro cell and the small cell operate asynchronously and there is a D2D terminal in a location that is outside the small cell coverage and distant from the small cell and, furthermore, none of the PSS/SSS transmitted form the small cell and the D2D synchronization signals (PD2DSSs) transmitted from D2D terminals that are present in the small cell coverage can be received, the D2D terminal synchronizes the D2D signal transmitting/receiving resources by using the PSS/SSS transmitted from the macro cell as the source of synchronization.

In this way, D2D terminals that are present within a small cell coverage or D2D terminals that are present outside a small cell coverage but still close to the small cell coverage use the same timing, which is synchronous with the small cell's downlink timing, for the synchronization of D2D signal transmitting/receiving resources. In this case, interference with cellular uplink communication can be avoided by means of time-division-multiplexing.

Also, D2D terminals that are present in locations that are outside the small cell coverage and distant from this small cell coverage use, for example, individual timings such as the macro cell downlink timing, for the synchronization of D2D signal transmitting/receiving resources. In this case, interference with cellular uplink communication in the small cell frequency is not a problem because the small cell and the D2D terminals are geographically apart.

D2D terminals that are present in distant locations from the small cell coverage such as these are unable to transmit and receive D2D signals to and from D2D terminals that are present in the small cell coverage or near the small cell coverage. However, if these D2D terminals that are present in distant locations from the small cell coverage are present in locations near D2D terminals that are present in the small cell coverage or near the small cell coverage, in must follow, in theory, that the D2D synchronization signals (PD2DSSs) that are transmitted from the D2D terminals present in the small cell coverage should be detected. However, if D2D terminals that are present in distant locations from the small cell coverage are unable to detect D2D synchronization signals (PD2DSSs), it then follows that these D2D terminals are geographically apart from other D2D terminals and are not in an environment in which D2D signals can be transmitted and received.

Following this, the scheduling of individual resources for use in transmitting and receiving D2D signals will be described.

In D2D transmission or reception, SC-FDMA (Single Carrier-Frequency Division Multiple Access) is the basic signal format. D2D terminals carry out transmission and reception in one uplink frequency, and therefore are subject to the limitation of half duplex of being unable to receive while transmission is in progress.

When multiple D2D carrier frequencies are included in the system information transmitted from a cellular base station such as that of a macro cell, the cellular base station designates the D2D carrier frequency together when reporting the D2D signal transmitting/receiving resources for use in D2D transmission or reception (D2D transmission/reception).

Figure 5:
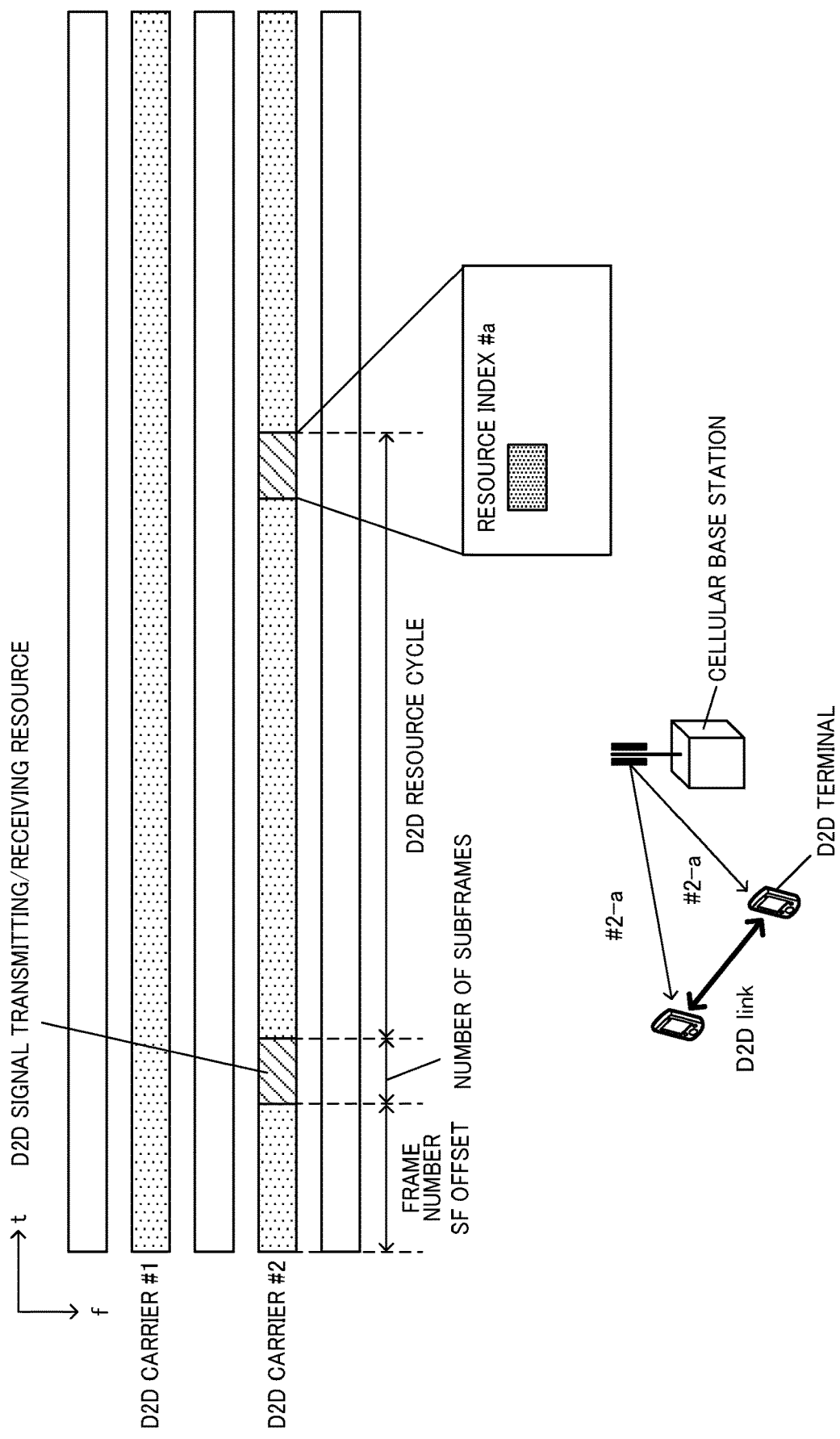
FIG. 5 is a diagram to explain a case where a plurality of D2D carrier frequencies are contained in system information that is transmitted from a cellular base station, according to the first example.

In the example shown in FIG. 5, two carrier frequencies—D2D carriers #1 and #2—are included in the system information that is transmitted from the cellular base station. In this case, when reporting resource index #a for use in D2D transmission or reception (D2D transmission/reception), the cellular base station specifies D2D carrier #2, in which resource index #a is included. The D2D carrier is reported using, for example, the CIF (Carrier Indicator Field) used in carrier aggregation.

In this way, by controlling the transmission and reception of D2D signals with a cellular frequency carrier (for example, a macro cell frequency), which is different from the frequency carriers which D2D terminals use as D2D signal transmitting/receiving resources (for example, small cell frequencies), the cluster head operations of D2D terminals in the network coverage become unnecessary, so that it is possible to reduce the power consumption in D2D terminals.

Second Example

With a second example, D2D signal transmission/reception control between varying operators will be described.

D2D signal transmission/reception should not be limited to operations within a single operator. Unless D2D signal transmission/reception is supported between varying operators, the use cases of D2D signal transmission/reception will be very much limited.

When D2D signals are transmitted and received between varying operators, different frequencies are configured as D2D carriers, on a per operator basis (see FIG. 6B), except when a common frequency is used as a D2D carrier between operators.

Figure 6A:
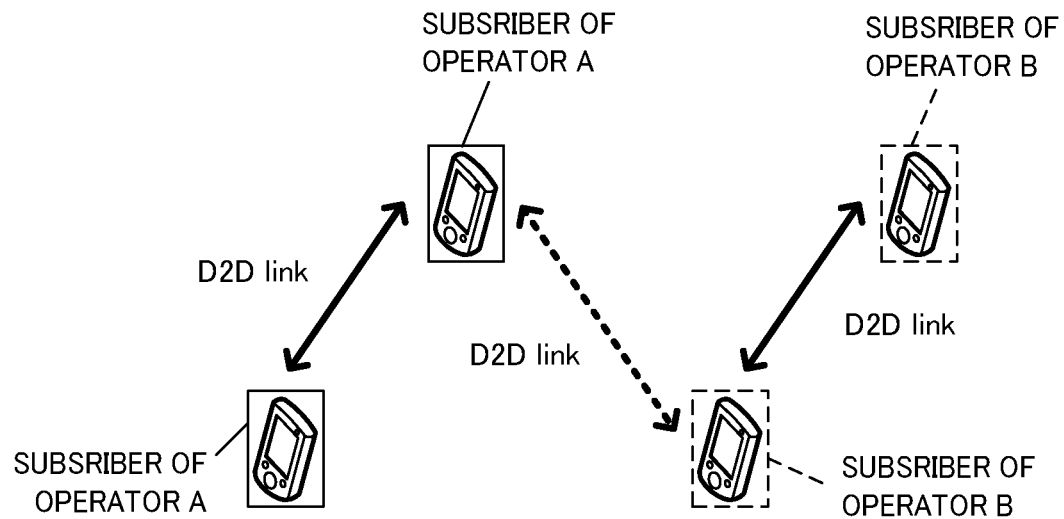
FIG. 6 provide diagrams to explain the transmission and reception of D2D signals between operators, according to a second example.
Figure 6B:
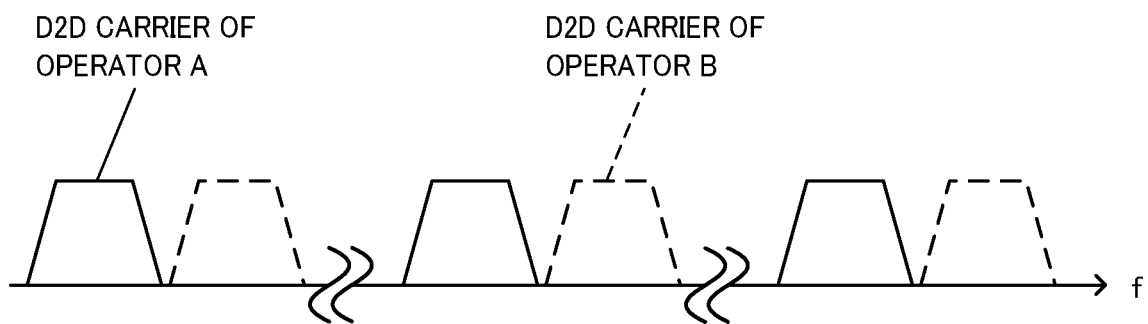

In this case, in order to provide support for D2D signal transmission/reception between varying operators, a D2D terminal has to not only support D2D signal transmission/reception in the D2D carrier of the operator to which the subject terminal subscribes, but also has to support, at least, D2D signal reception in other operators' D2D carriers (see FIG. 6A).

To allow a D2D terminal to receive D2D signals in another operator's D2D carrier, the D2D terminal has to know the D2D carrier and the D2D signal transmitting/receiving resource structure of the other operator.

In the operation in which D2D signal transmitting/receiving resources are allocated completely asynchronously between operators, a D2D terminal has to hold a plurality of synchronization sources and keep monitoring over a plurality of timings for D2D signal transmission/reception between operators. Since the time the D2D terminal has to keep monitoring becomes longer, this method is not practical from the perspective of power consumption and efficiency of the D2D terminal.

So, it is preferable if a D2D terminal can identify other operators' D2D signal transmitting/receiving resource structures as follows.

The D2D terminal scans the whole of the band it supports, and identifies each operator's D2D carrier and time domain resource information. For signal transmission in D2D signal transmission/reception, the D2D terminal uses D2D signal transmitting/receiving resources in the frequency carrier of the operator to which the subject terminal subscribes. For signal reception in D2D signal transmission/reception, the D2D terminal uses D2D signal transmitting/receiving resources in the frequency carriers of other identified operators as well.

Figure 7:
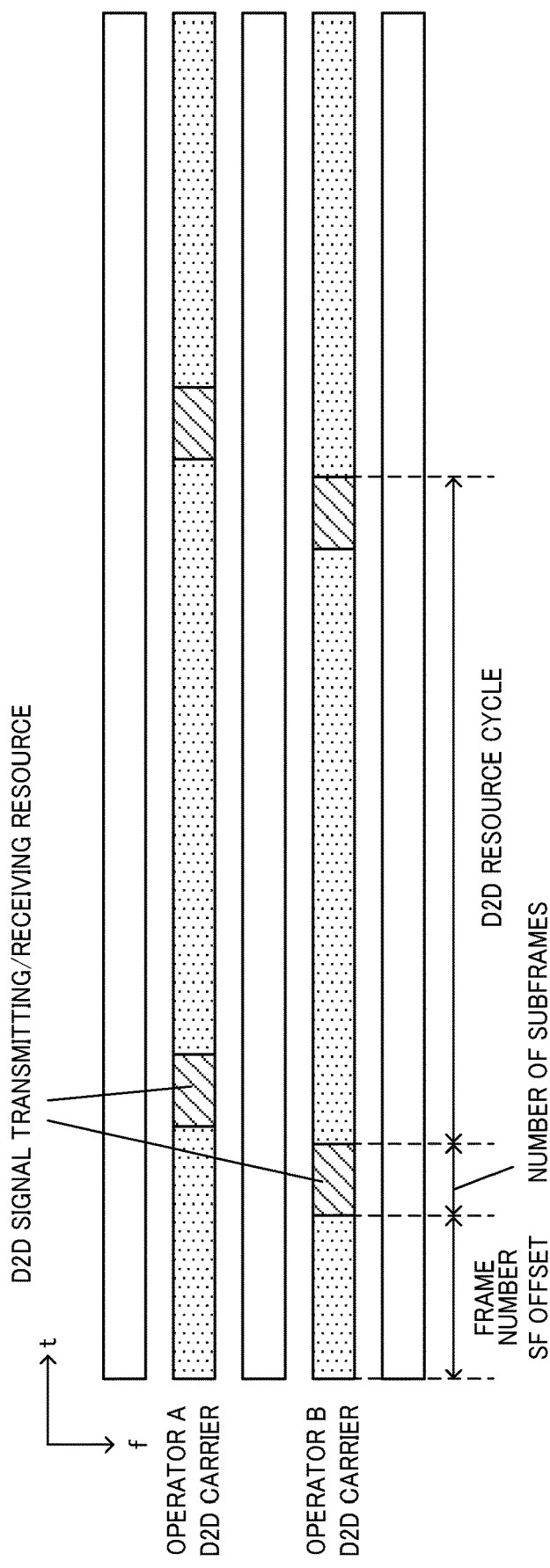
FIG. 7 is a diagram to explain a D2D signal transmitting/receiving resource structure according to a second example.

Given the precondition that a D2D terminal is unable to monitor a plurality of D2D frequency carriers at the same time, D2D signal transmitting/receiving resources need to be shifted in time between operators (see FIG. 7). In the example shown in FIG. 7, the locations of D2D signal transmitting/receiving resources are shifted in time between operator A's D2D carrier and operator B's D2D carrier.

A D2D terminal does not monitor frequency carriers that employ structures to configure D2D signal transmitting/receiving resources in locations that are distant to a certain degree from the D2D signal transmitting/receiving resource for the operator to which the subject terminal subscribes. This is because, in this case, the D2D carrier of the operator to which the subject terminal subscribes and the D2D carrier of other operators are likely to operate asynchronously, resulting in a significant increase of power consumption.

By supporting D2D signal transmission/reception between varying operators in this way, it may be possible to make effective use of D2D signal transmission/reception in a wide range.

(Structure of Radio Communication System)

Now, a structure of a radio communication system according to the present embodiment will be described below. In this radio communication system, the radio communication methods according to the above-described first example and second example are employed.

Figure 8:
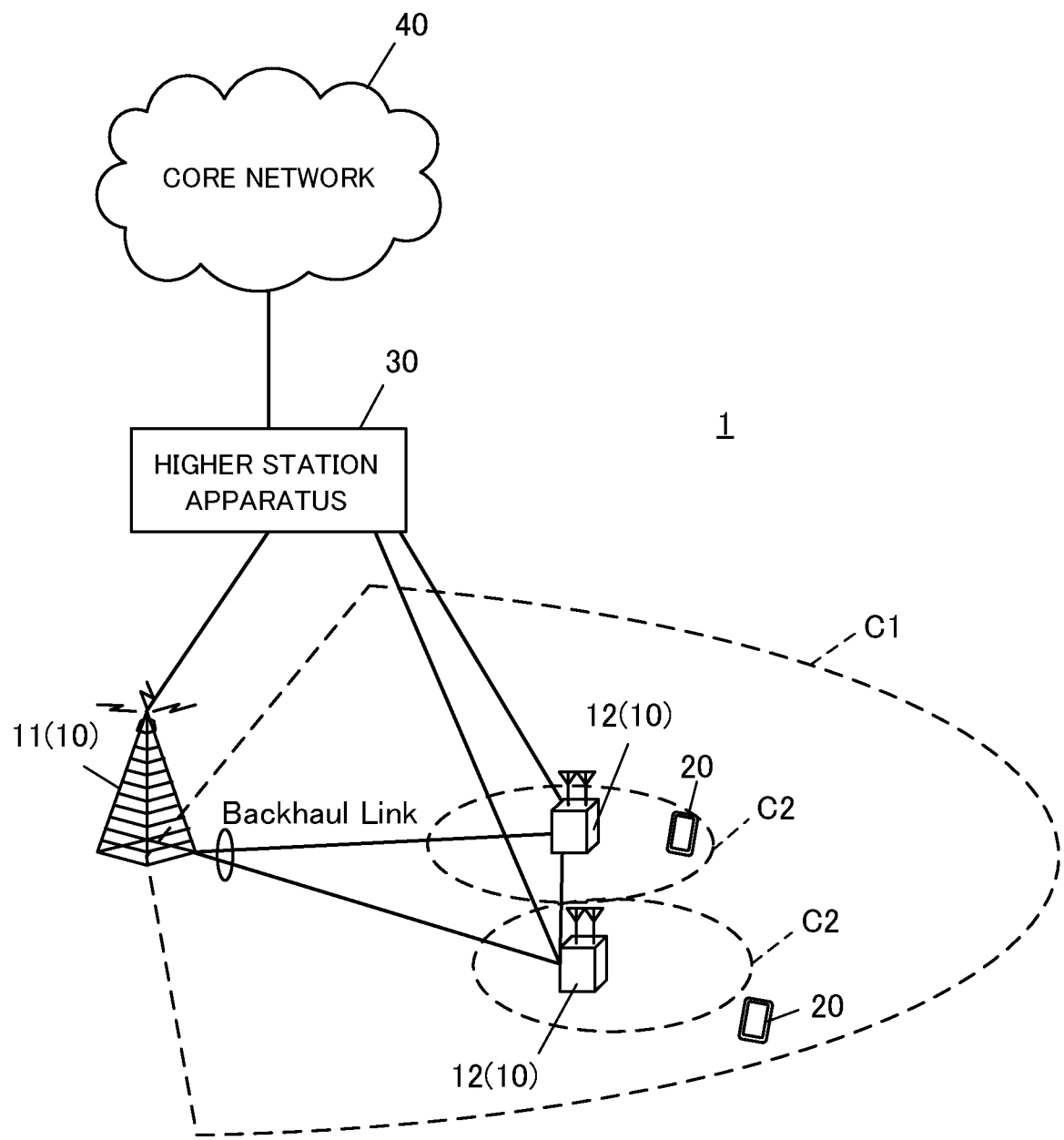
FIG. 8 is a schematic diagram to show an example of a radio communication system according to the present embodiment.

FIG. 8 is a schematic structure diagram to show an example of the radio communication system according to the present embodiment. As shown in FIG. 8, the radio communication system 1 includes a plurality of radio base stations 10 (11 and 12), and a plurality of user terminals 20 that are present in cells formed by each radio base station 10 and are structured to be capable of communicating with each radio base station 10. The radio base stations 10 are each connected with a higher station apparatus 30, and are connected to a core network 40 via the higher station apparatus 30.

In FIG. 8, the radio base station 11 is, for example, a macro base station having a relatively wide coverage, and forms a macro cell C1. The radio base stations 12 are small base stations having local coverages, and form small cells C2. Note that the number of radio base stations 11 and 12 is not limited to the number illustrated in FIG. 8.

In the macro cell C1 and the small cells C2, the same frequency band may be used, or different frequency bands may be used. Also, the radio base stations 11 and 12 are connected with each other via an inter-base station interface (for example, optical fiber, the X2 interface, etc.).

The user terminals 20 are terminals to support various communication schemes such as LTE, LTE-A and so on, and may include both mobile communication terminals and stationary communication terminals. The user terminals 20 can communicate with other user terminals 20 via the radio base stations 10. Also, the user terminals 20 can directly communicate with other user terminals 20 (D2D) without involving the radio base stations 10.

The higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared Channel), which is used by each user terminal 20 on a shared basis, downlink control channels (PDCCH (Physical Downlink Control Channel) and EPDCCH (Enhanced Physical Downlink Control Channel)), a broadcast channel (PBCH) and so on are used as downlink channels. User data, higher layer control information and predetermined SIBs (System Information Blocks) are communicated by the PDSCH. Downlink control information (DCI) is communicated by the PDCCH and the EPDCCH.

In the radio communication system 1, an uplink shared channel (PUSCH: Physical Uplink Shared Channel) that is used by each user terminal 20 on a shared basis, an uplink control channel (PUCCH: Physical Uplink Control Channel) and so on are used as uplink channels. User data and higher layer control information are communicated by the PUSCH.

In the radio communication system 1, discovery signals for allowing the user terminals 20 to detect each other are transmitted on the uplink.

Figure 9:
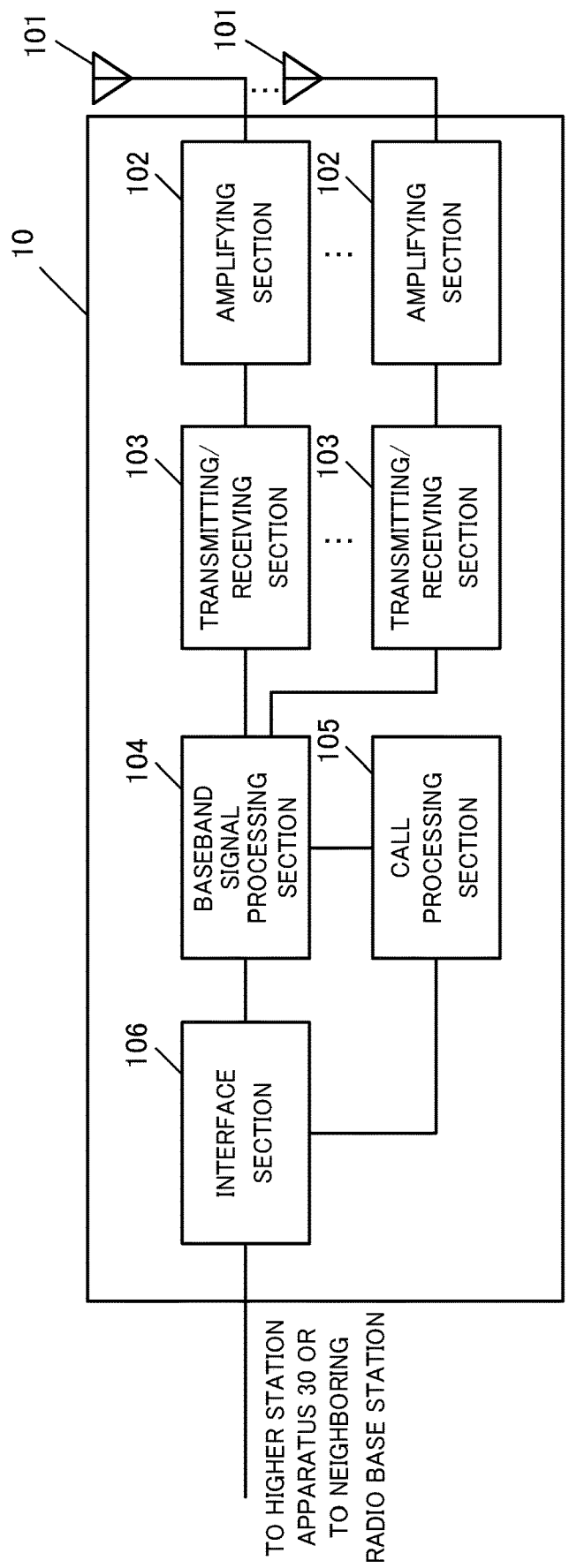
FIG. 9 is a diagram to explain an overall structure of a radio base station according to the present embodiment.

FIG. 9 is a diagram to explain an overall structure of a radio base station 10 according to the present embodiment. The radio base station 10 has a plurality of transmitting/receiving antennas 101 for MIMO (Multiple Input Multiple Output) communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

The baseband signal processing section 104 performs a PDCP (Packet Data Convergence Protocol) layer process, division and coupling of user data, RLC (Radio Link Control) layer transmission processes such as an RLC retransmission control transmission process, MAC (Medium Access Control) retransmission control, including, for example, an HARQ (Hybrid Automatic Repeat reQuest) transmission process, scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

Each transmitting/receiving section 103 reports a D2D discovery resource group to each user terminal 20. Each transmitting/receiving section 103 transmits, to each user terminal 20, information about the location where the resource where the discovery signal for use in D2D discovery is initially allocated. Each transmitting/receiving section 103 reports pre-rules to each user terminal 20.

In the baseband signal processing section 104, the user data that is included in the input uplink signals is subjected to FFT (Fast Fourier Transform) processing, an IDFT process, error correction decoding, a MAC retransmission control receiving process, and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 10:
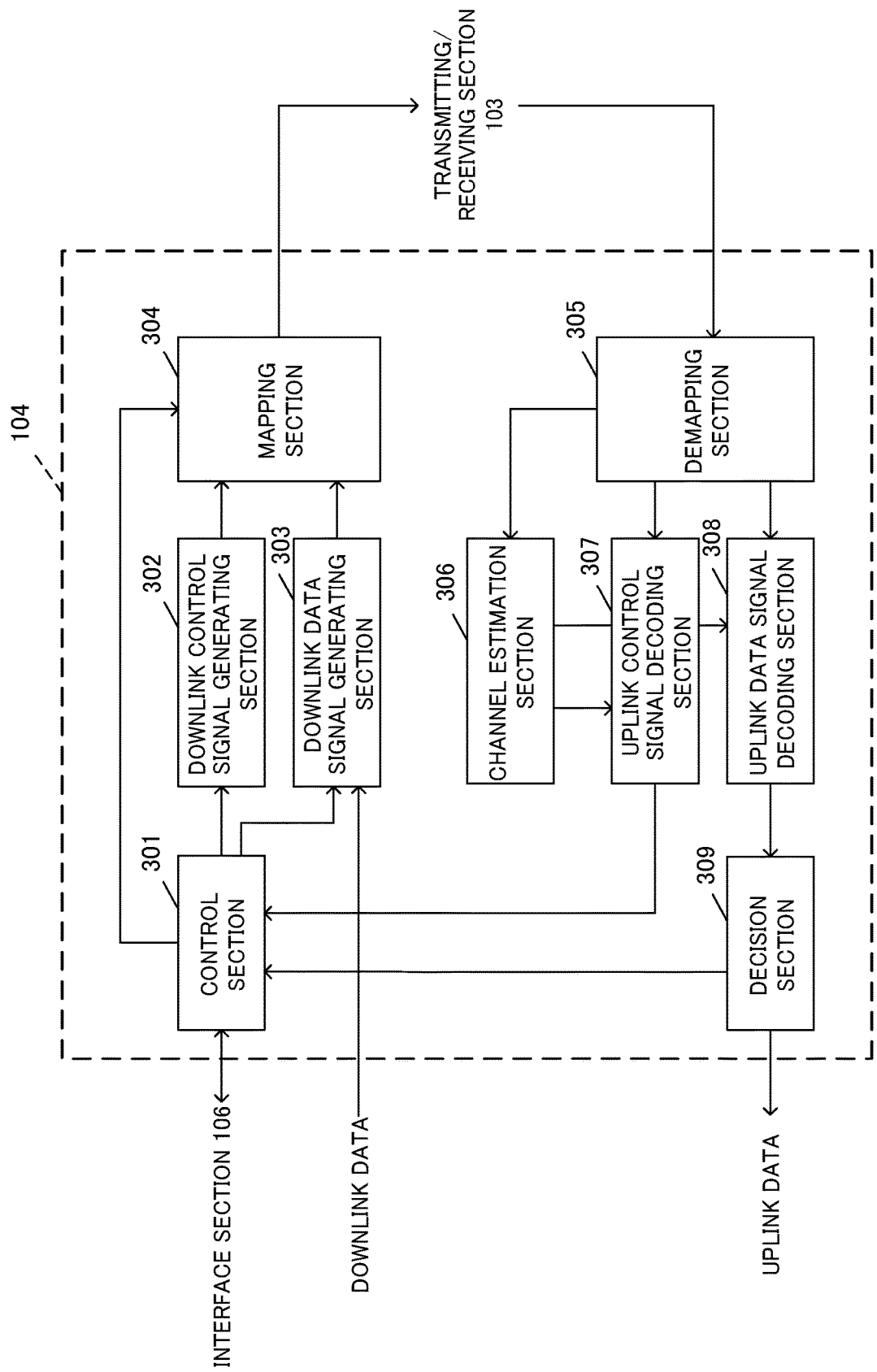
FIG. 10 is a diagram to explain a functional structure of a radio base station according to the present embodiment.

FIG. 10 is a diagram to show a principle functional structure of the baseband signal processing section 104 provided in the radio base station 10 according to the present embodiment. As shown in FIG. 10, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is communicated in one or both of the PDCCH and the enhanced PDCCH (EPDCCH), downlink reference signals and so on. Also, the control section 301 controls the scheduling of RA preambles that are communicated in the PRACH (Physical Random Access Channel), uplink data that is communicated in the PUSCH, uplink control information that is communicated in the PUCCH or the PUSCH and uplink reference signals (allocation control). Information about the allocation of uplink signals (uplink control signals, uplink user data, etc.) is reported to the user terminal 20 by using downlink control information (DCI).

The control section 301 controls the allocation of radio resources to the downlink signals and the uplink signals based on command information from the higher station apparatus 30, feedback information from each user terminal 20 and so on. That is, the control section 301 functions as a scheduler.

The control section 301 executes control so that system information, which contains at least D2D signal transmitting/receiving resource information, is reported to the user terminal 20. The control section 301 executes control so that information about the state of synchronization between the frequency carrier in which the user terminal 20 executes D2D signal transmission/reception and the frequency carrier in which D2D signal transmission/reception for the user terminal 20 is controlled is included in the system information and reported to the user terminal 20.

The downlink control signal generating section 302 generates downlink control signals (which may be both PDCCH signals and EPDCCH signals, or may be one of these) that are determined to be allocated by the control section 301. To be more specific, the downlink control signal generating section 302 generates downlink assignments, which report downlink signal allocation information, and UL grants, which report uplink signal allocation information, based on commands from the control section 301.

The downlink data signal generating section 303 generates downlink data signals (PDSCH signals) that are determined to be allocated to resources by the control section 301. The data signals generated in the downlink data signal generating section 303 are subjected to a coding process and a modulation process, using coding rates and modulation schemes that are determined based on CSI (Channel State Information) from each user terminal 20 and so on.

The mapping section 304 controls the allocation of the downlink control signals generated in the downlink control signal generating section 302 and the downlink data signals generated in the downlink data signal generating section 303 to radio resources based on commands from the control section 301.

The demapping section 305 demaps uplink signals transmitted from the user terminal 20 and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals and/or the like) transmitted from the user terminal in the uplink control channel (PRACH, PUCCH, etc.), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (A/N decisions) based on the decoding results in the uplink data signal decoding section 308, and outputs results to the control section 301.

Figure 11:
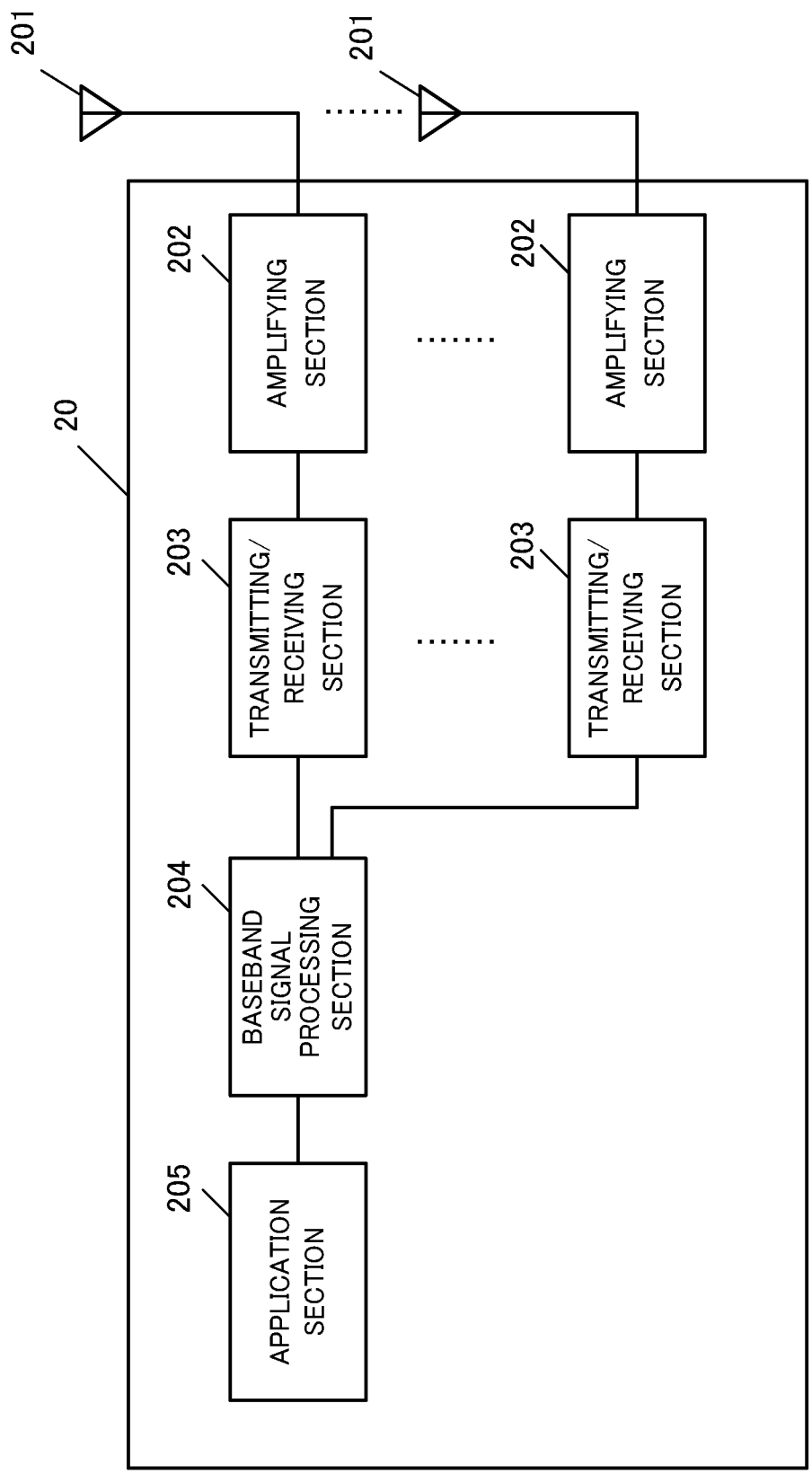
FIG. 11 is a diagram to explain an overall structure of a user terminal according to the present embodiment.

FIG. 11 is a diagram to show an overall structure of a user terminal 20 according to the present embodiment. As shown in FIG. 11, the user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

The transmitting/receiving sections 203 receive the system information, which is transmitted from the connecting or serving radio base station 10 and which contains at least D2D signal transmitting/receiving resources information. The transmitting/receiving sections 203 transmit signals transmitted using part of the D2D signal transmitting/receiving resources specified in the specified frequency carrier. The transmitting/receiving sections 203 receive signals transmitted from other user terminals 20 from the D2D signal transmitting/receiving resources.

Figure 12:
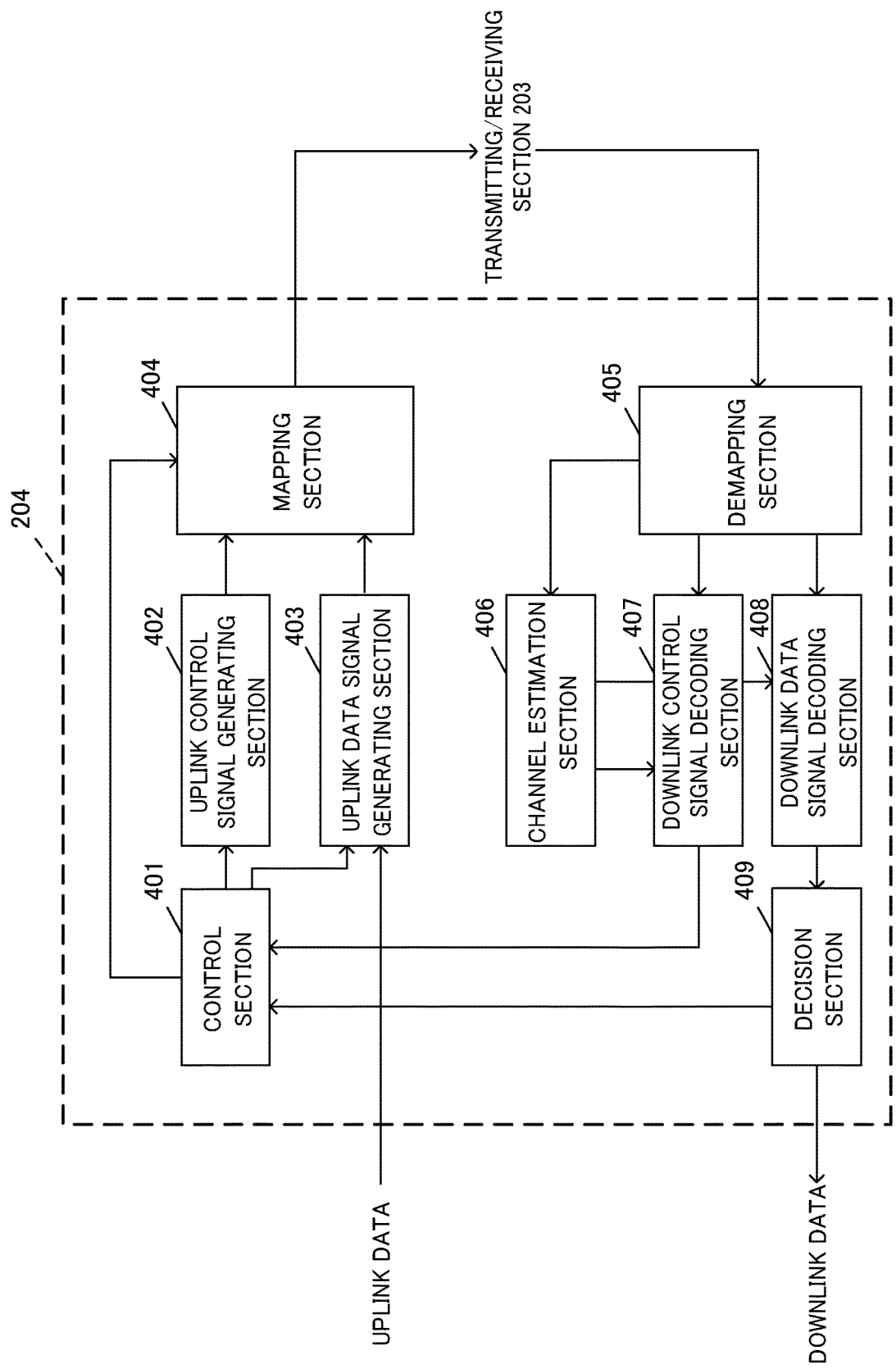
FIG. 12 is a diagram to explain a functional structure of a user terminal according to the present embodiment.

FIG. 12 is a diagram to show a principle functional structure of the baseband signal processing section 204 provided in the user terminal 20. As shown in FIG. 12, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals, etc.), uplink data signals and so on based on downlink control signals (PDCCH signals) transmitted from the radio base station 10, retransmission control decisions in response to the PDSCH signals received, and so on. The downlink control signals received from the radio base station are output from the downlink control signal decoding section 407, and the retransmission control decisions are output from the decision section 409.

The control section 401 controls the allocation of the signals in D2D signal transmission/reception to D2D signal transmitting/receiving resources based on the D2D signal transmitting/receiving resources information reported from the radio base station 10. The control section 401 controls the synchronization of D2D signal transmitting/receiving resources based on the system information.

The uplink control signal generating section 402 generates uplink control signals (feedback signals such as delivery acknowledgement signals, channel state information (CSI) and so on) based on commands from the control section 401. The uplink data signal generating section 403 generates uplink data signals based on commands from the control section 401. Note that, when a UL grant is contained in a downlink control signal reported from the radio base station, the control section 401 commands the uplink data signal generating section 403 to generate an uplink data signal.

The mapping section 404 controls the allocation of the uplink control signals (delivery acknowledgment signals and so on) and the uplink data signals to radio resources (PUCCH, PUSCH, etc.) based on commands from the control section 401. The mapping section 404 controls the allocation of signals in D2D signal transmission/reception to D2D signal transmitting/receiving resources based on commands from the control section 401.

The demapping section 405 demaps downlink signals transmitted from the radio base station 10 and separates the downlink signals. The channel estimation section 406 estimates channel states from the reference signals included in the received signals separated in the demapping section 406, and outputs the estimated channel states to the downlink control signal decoding section 407 and the downlink data signal decoding section 408.

The downlink control signal decoding section 407 decodes the downlink control signals (PDCCH signals) transmitted in the downlink control channel (PDCCH), and outputs the scheduling information (information regarding the allocation to uplink resources) to the control section 401. Also, if information related to the cells for feeding back delivery acknowledgment signals and information as to whether or not RF (Radio Frequency) tuning is applied are included in downlink control signals, these pieces of information are also output to the control section 401.

The downlink data signal decoding section 408 decodes the downlink data signals transmitted in the downlink shared channel (PDSCH), and outputs the results to the decision section 409. The decision section 409 makes retransmission control decisions (A/N decisions) based on the decoding results in the downlink data signal decoding section 408, and outputs the results to the control section 401.

The present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2013-269756, filed on Dec. 26, 2013, including the specification, drawings and abstract, is incorporated herein by reference in its entirety.

The invention claimed is:

1. A user terminal capable of device-to-device (D2D) transmission and reception, comprising:
    a receiver that receives system information for D2D signal transmission and reception; and
    a processor that, based on resource information for D2D signal transmission and reception, controls to perform the D2D signal transmission and reception in a second frequency carrier which is different from a first frequency carrier in which the resource information for D2D signal transmission and reception is transmitted,
    wherein when a first cell and a second cell operate synchronously, the processor synchronizes the D2D signal transmission and reception by using a Primary Synchronization Signal/Secondary Synchronization Signal (PSS/SSS), provided as a synchronization source for the first cell, and
    wherein when the first cell and the second cell operate asynchronously, the processor synchronizes the D2D signal transmission and reception by using the PSS/SSS transmitted from the second cell as the synchronization source.

* * * * *